United States Patent [19]
Gilmore

[11] 4,033,208
[45] July 5, 1977

[54] FACING TOOL

[75] Inventor: Guy T. Gilmore, Crosby, Tex.

[73] Assignee: Multi-Fab, Inc., Houston, Tex.

[22] Filed: Nov. 6, 1975

[21] Appl. No.: 629,641

[52] U.S. Cl. .............................................. 82/4 C
[51] Int. Cl.² ........................................ B23B 5/16
[58] Field of Search .................................. 82/4 C

[56] References Cited

UNITED STATES PATENTS

| | | | |
|---|---|---|---|
| 2,436,152 | 2/1948 | Richards | 82/4 C |
| 2,518,929 | 8/1950 | Peters | 82/4 C |
| 3,167,982 | 2/1965 | Sherwood | 82/4 C |
| 3,630,109 | 12/1971 | MacMichael et al. | 82/4 C |
| 3,762,246 | 10/1973 | Becker | 82/4 C |
| 3,813,968 | 6/1974 | Thomas | 82/4 C |
| 3,819,163 | 6/1974 | Stunkard | 82/4 C |
| 3,872,748 | 3/1975 | Djalme et al. | 82/4 C |
| 3,916,519 | 11/1975 | Gilmore | 82/4 C |

*Primary Examiner*—Leonidas Vlachos
*Attorney, Agent, or Firm*—Ranseler O. Wyatt

[57] ABSTRACT

A multi-purpose facing tool mounted on an adjustable boom for cutting faces on flanges, and the like, or cutting grooves in flange faces, adaptable to many sizes of flanges, having novel driving means mounted on the retaining spider, and including an adjustable guide means for maintaining the boom and boom supporting means aligned and in constantly driving position.

6 Claims, 8 Drawing Figures

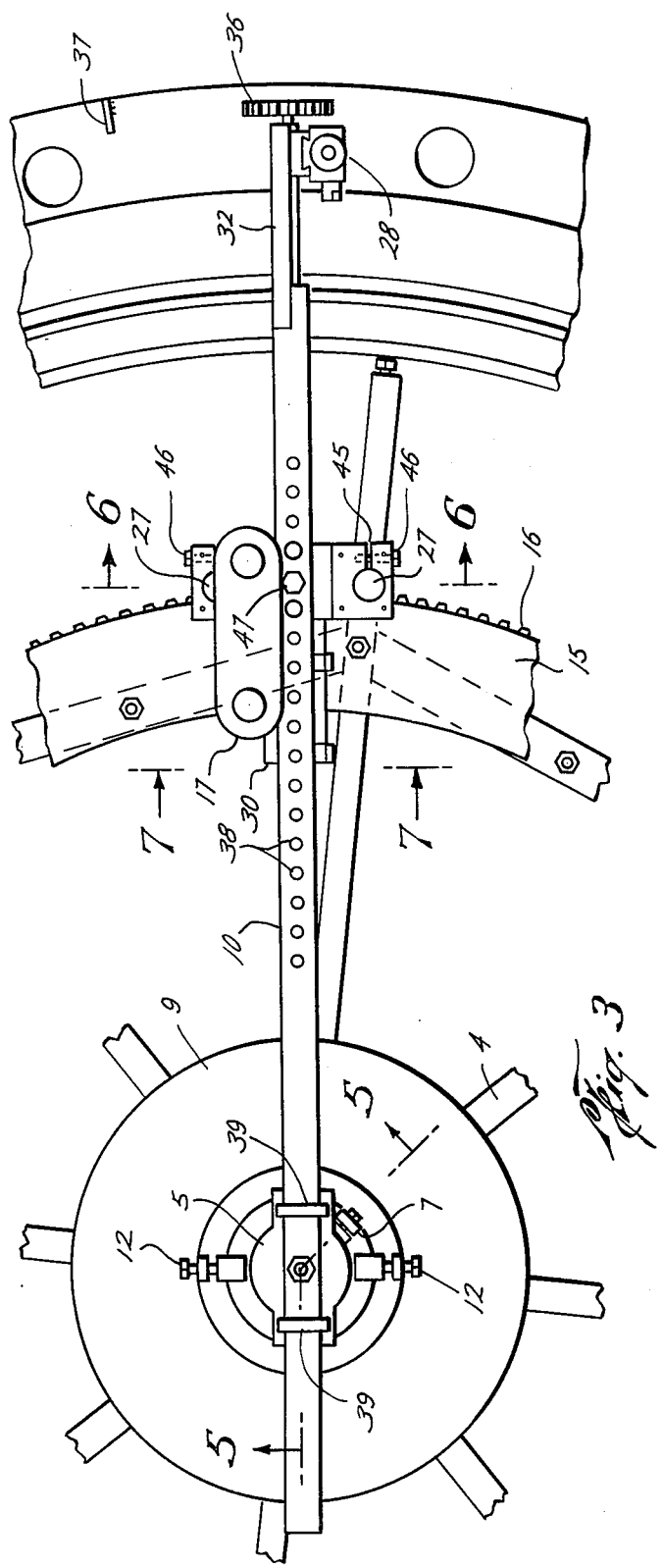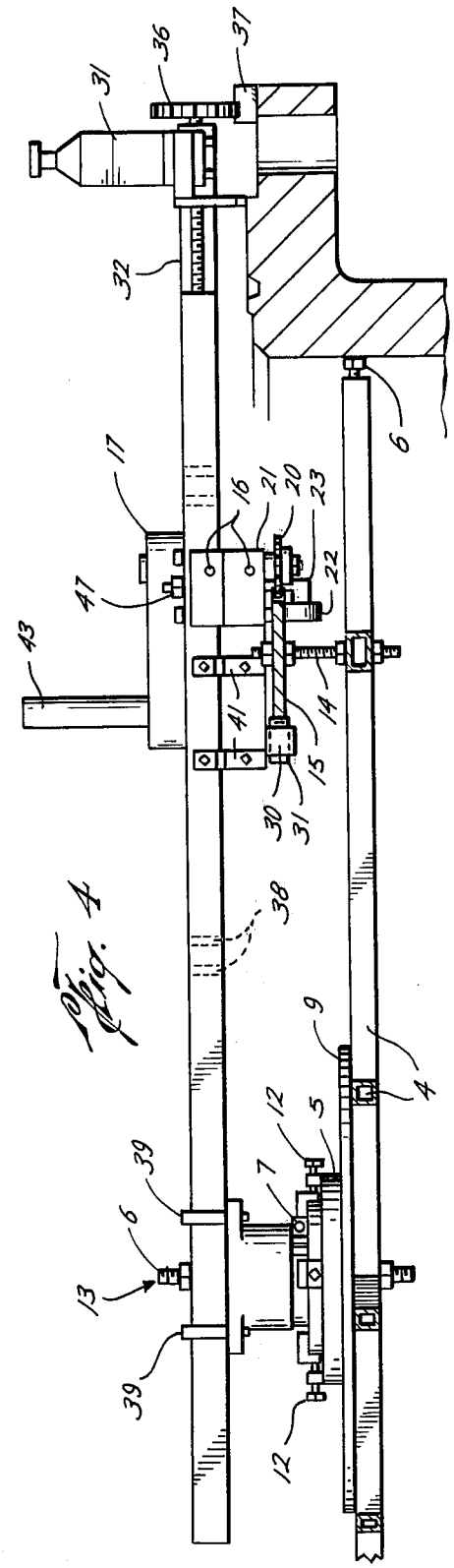

FACING TOOL

BACKGROUND OF THE INVENTION

In facing and grooving tools, the size of the work to be faced or grooved runs from a few inches to many feet. The average facing tool is provided with means for adjustment, but the range of adjustment is limited. When the large diameter flanges are encountered, the work becomes difficult and costly, requiring cumbersome equipment. It is an object of this invention to provide a tool where normal sizes of flanges may be worked on, or, by minor adjustments, the extreme diameter sizes may be worked on with the same equipment.

SUMMARY OF THE INVENTION

A boom mounted flange facing tool having drive means for radial movement of a cutting blade in which a chain is mounted on an annular support, and a gear, in mesh with the links of said chain, is rotated to radially move a boom on which the cutting blade is mounted, the driving means supporting the boom and being maintained in alignment with the axis of the boom by upper and lower adjustable rollers and having a brake means to maintain a tension on the driven gear so that the driving means will remain in engagement with the chain.

BRIEF DESCRIPTION OF THE DRAWINGS

FIG. 3 is a fragmentary view of the device mounted on a work piece, showing the boom, driving mechanism and cutting means.

FIG. 4 is a side elevational cross sectional view taken on the line 4—4 of FIG. 3.

DESCRIPTION OF THE PREFERRED EMBODIMENT

Figure 1:
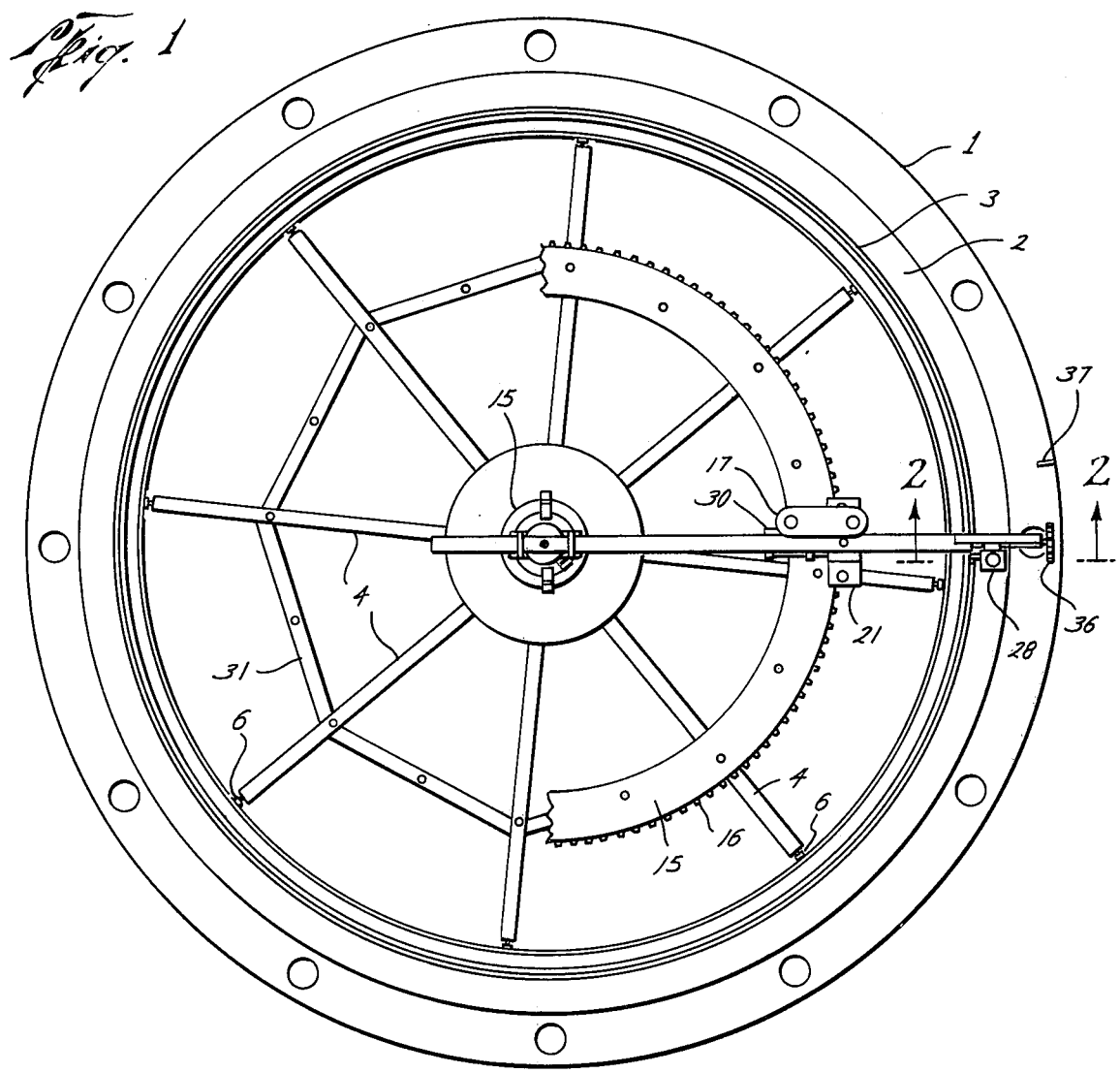
FIG. 1 is a top plan view of the device mounted on a tubular, flanged piece of work.
Figure 2:
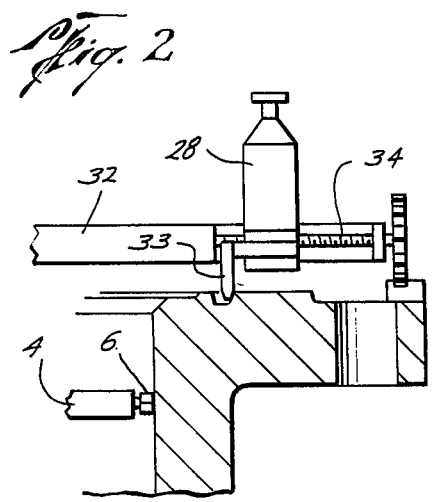
FIG. 2 is a cross sectional elevational view of the cutting means taken on the line 2—2 of FIG. 1.
Figure 2A:
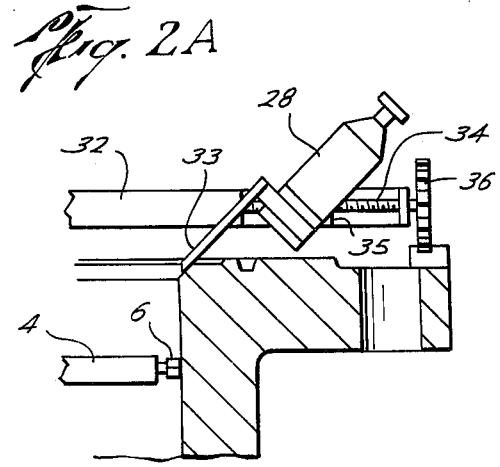
FIG. 2A is a cross sectional, elevational view of the cutting means in another position.
Figure 5:
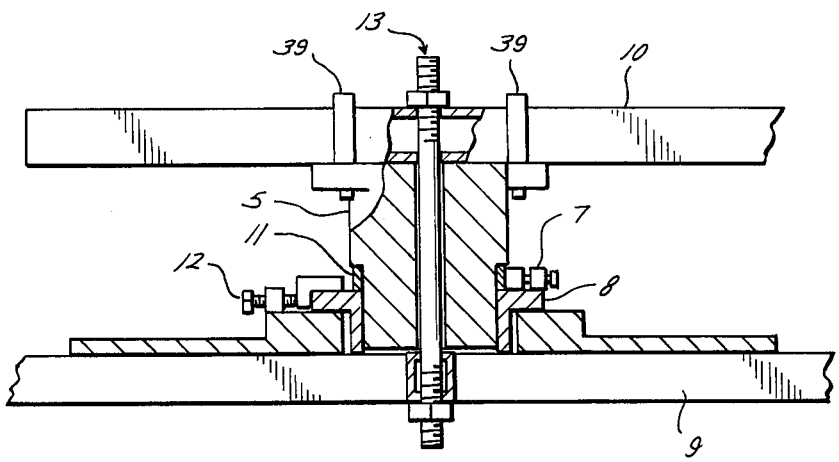
FIG. 5 is a fragmentary cross sectional elevational view, taken on the line 5—5 of FIG. 3, showing the brake means employed.
Figure 6:
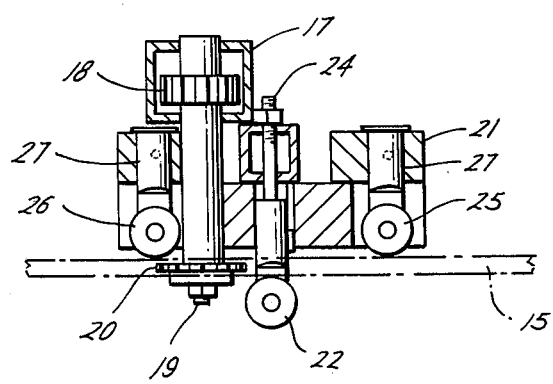
FIG. 6 is a side elevational cross sectional view of the drive mechanism, taken on the line 6—6 of FIG. 3.
Figure 7:
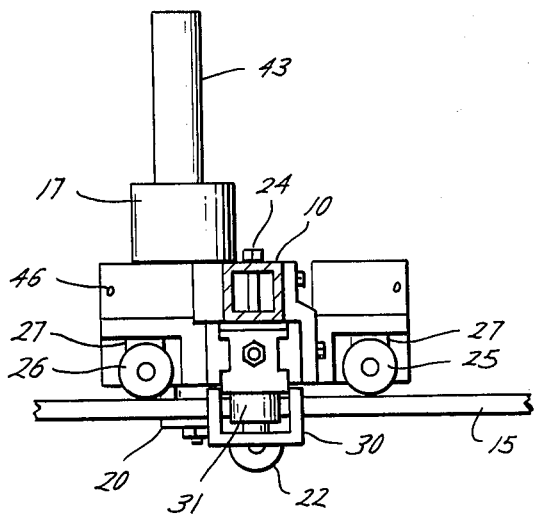
FIG. 7 is an elevational view, partially in cross section, showing the drive means, taken on the line 7—7 of FIG. 3.

In the drawings, the numeral 1 designates a flanged tubular work piece having the face 2 and groove 3 to be cut. The tool is mounted on the work by means of the spider having legs 4, 4 extending radially from the hub plate 9. The ends of the legs 4, 4 have adjustable bolts 6 to permit adjustment of the hub 5 on the work, the extended ends of the legs bearing against the inside wall of the work piece. A brake 7 is adapted to move against the brake shoe 11, to adjustably maintain a drag on the hub 5 as the boom 10 rotates. The hub 5 is mounted on the hub plate 9 from which the spider legs 4, 4 extend, and the adjusting bolts 12, 12 are provided for aid in centering the hub on the work. The bolt 13 passes through the boom 10 and the hub plate 9, and permits rotation of the boom thereon.

Mounted on the legs 4, by means of the bolts 14 and the struts 31, is an annular template 15 having a peripherial groove in which a link chain 16 is mounted. A driving mechanism, such as the driving gears 18 in the housing 17, rotates the drive shaft 19 and gear 20, from a suitable source of power, such as an air motor 43. Supporting housing 21, in which the front and rear upper adjustable support wheels 25, 26 are mounted, and the adjustable bottom wheel 22 is extended therefrom on the yoke 23, which may be vertically adjustable by means of the bolt 24, is integral with the gear housing 17. The wheels 25, 26 are mounted on adjustable shafts 27, 27 which permit the axis of the wheels 25, 26 to be aligned with the axis of the bolt 47 and hub bolt 6. The said shafts 27, 27 extend through the split ports 45, 45 in the housing 21, and said ports are held closed by the lock bolts 46, 46 when the wheels are aligned. A bracket 30 extends from the housing 21 across the templates 15 and is bent downwardly adjacent the periphery of the template 15, so that it extends downwardly over the side margin thereof, and carries the guide wheel 31, which bears against the periphery of the template 15, thus maintaining the gear 20 in engagement with the links of the chain 16. The chain 16, mounted in the peripherial groove of the template 15, receives the teeth of the gear 20. The boom 10 extends on outwardly and has the cutter blade holder 28 mounted in the extended end thereof, which moves longitudinally along the track 32. The cutter blade holder with the cutter 33 mounted therein, moves longitudinally along the track 32, at the end of the boom 10, the threaded screw 34 passing through a threaded passageway (not shown) in the cutter blade holder key 35, and the screw 34 is rotated by the star gear 36, said gear being rotated by the fixed finger 37 mounted on the flange of the work piece 1, as the boom passes over said finger during rotation.

The boom 10 has a plurality of vertical ports 38, 38 formed therein to permit varied lengths for varied sizes of work pieces. It is contemplated that the spider legs 4 may be telescoping members and smaller templates and chains may be provided so that the machine may work on smaller diameter pieces, the legs 4 may be shortened and the struts 31 replaced and smaller templated and chains installed.

The boom 10 is mounted on the hub 5 through the brackets 39, 39 with the bolt 13 passing through the selected ports 38; the housing 21 is mounted on the template 15 by means of the bolt 47 extended through a selected port 40, in the boom 10. The drive mechanism and boom support are mounted on the template 15 and the wheels 26, 27, when aligned with the axis of the boom, are locked in position and the air motor is actuated, rotating the drive shaft 19 and drive gear 20, which travels in the chain 16 mounted in the peripherial groove of the template 15, rotating the boom 10. The brake 7 is adjusted to provide sufficient tension on the drive gear to maintain the gear 20 in engagement during rotation and when changing speed of the drive gear. The cutter blade holder 28 is adjustably mounted on the key 35 where it may be positioned for a facing cut, a groove cut or a bevel cut, as desired.

The star gear feeds the cutter blade holder into the work, advancing the cutter upon each rotation of the boom 10.

What I claim is:

1. A cutting tool for facing or grooving flanges on tubular material, an anchoring means movable against the inside wall of a tubular member, a hub axially mounted in said anchoring means, means for controlled rotation of said hub, a boom mounted on said hub and having one end extended radially therefrom, a plurality of interchangeable templates of varied diameters, one of which is coaxially mounted on said anchoring means, a link chain mounted on the periphery of said template, driving means mounted on said boom and confined to said template and having a driving gear to mesh with said chain adapted to rotate said boom, cutting means mounted on the extended end of said boom.

2. The device defined in claim 1 wherein said controlled rotation of said hub consists of a brake shoe and a brake adjustably mounted on said hub.

3. The device defined in claim 1 wherein said boom has a plurality of vertical parts extended therethrough for selective mounting on said hub.

4. The device defined in claim 1 wherein said template has a peripheral groove, and the said link chain is mounted in said groove.

5. The device defined in claim 1 wherein said driving means mounted on said template has a guide means consisting of a wheel housing, having wheel parts therein, wheel shafts having wheels at one end and being adjustably mounted in said housing and riding on the upper and lower faces of said template, and a bracket extending over the template supporting a guide wheel bearing against the inside wall of said template.

6. The device defined in claim 1 wherein said driving means mounted on said template has a guide means consisting of a wheel housing having wheel parts therein, wheel shafts having wheels at one end and being adjustably mounted in said housing and riding on the upper and lower faces of said template, and a bracket extending over the template supporting a guide wheel bearing against the inside wall of said template, said ports and wheel housing being split and locking bolts mounted in said housing, through said splits, and releasably anchored therein.

* * * * *